Patented Oct. 18, 1949

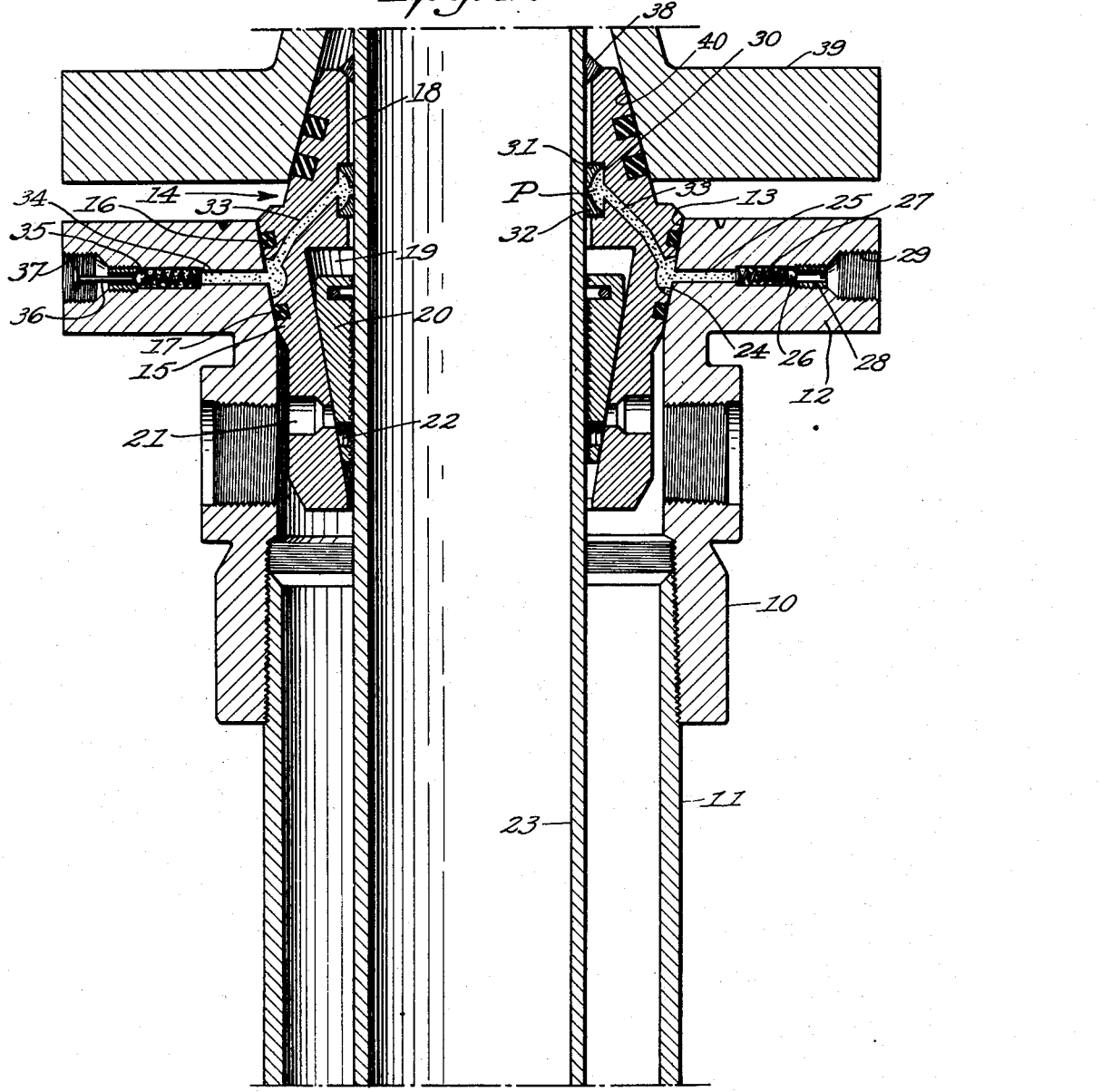

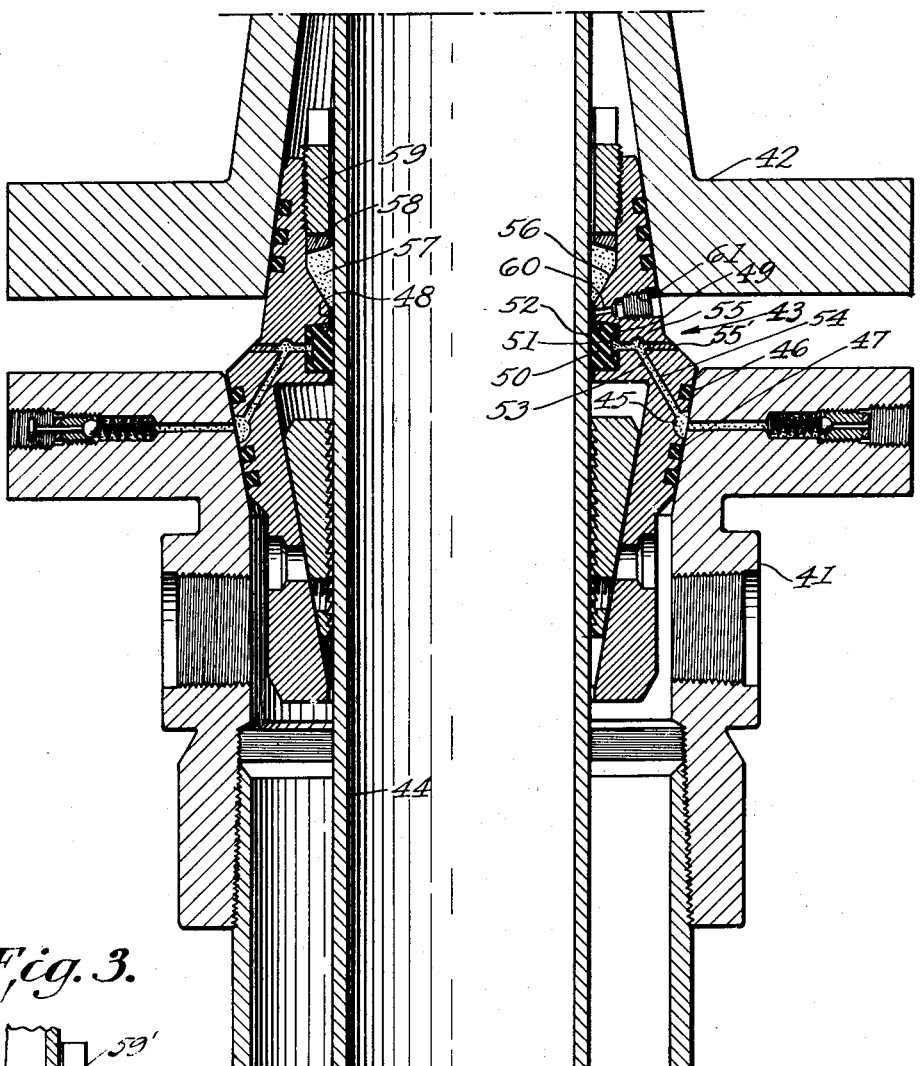
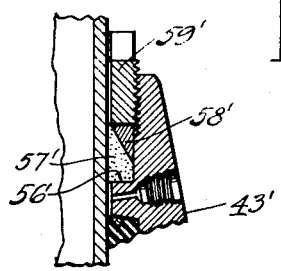

2,485,497

UNITED STATES PATENT OFFICE 2,485,497

WELLHEAD EQUIPMENT

John Lemley, Erwin F. Hill, and Robert A. Mueller, Houston, Tex., assignors to Gray Tool Company, Houston, Tex., a corporation of Texas Application December 26, 1944, Serial No. 569,863

11 Claims. (Cl. 285—22)

The present invention relates to well head equipment including a slip suspension casing hanger with means for providing a seal between the hanger and the suspended pipe at least adequate to hold the well pressure from the time the pipe is hung until a second seal, which is permanent in nature, can be formed after the control equipment has been removed.

In the U. S. patent to Mueller and Yancey, No. 2,117,444, granted May 17, 1938, there is disclosed a system providing an available temporary seal around a pipe while it is being hung in the well. In that patent the pipe suspending means is specifically shown as a boll weevil type hanger forming a seal with a supporting casing head. In the U. S. patent to Roye, No. 2,207,469, granted July 9, 1940, there is disclosed a system differing from the above in that a slip suspension casing hanger is used, a weld being provided as a seal between the hanger of the suspended pipe after the control equipment has been removed. However, between the time the control equipment is removed and the weld can be made, well pressure can escape upwardly between the hanger and the suspended pipe so that at this point the well is not under complete control and a dangerous condition exists, particularly as regards the welding operation. The main object of the present invention is to obviate this condition by providing means for sealing off between a slip suspension hanger and the pipe suspended thereby before the removal of the control equipment and at least until a permanent seal can be formed, thereby holding the well under complete control at a critical time. How this and other objects may be accomplished will be described with reference to the illustrative showing of the acompanying drawings in which Figure 1 shows in vertical axial section an installation in accordance with the invention.

Figure 2 is a similar view of another installation in accordance with the invention, and Figure 3 is a fragmentary axial section illustrating a modification applicable in the installation of Figure 2.

Referring first to Figure 1, reference numeral 10 designates a casing head threaded to the upper end of a casing 11 which has been set. The casing head includes the usual bolting flange 12 and upwardly tapered conical seat 13.

As here shown, the hanger 14 is the same in general design as that shown in the above-mentioned patent to Roye. The body of the hanger includes a tapered portion 15 engaged with the seat 13, the seated portion including at least two hydraulic packing rings 16 and 17 set therein, these rings forming a seal between portion 15 and the seat 13. The hanger body is provided with an axial opening or bore 18 enlarged in its lower part to provide a slip bowl 19 receiving the slips 20 which, prior to use, were maintained in retracted position by means of screws passed through radial openings 21 in the hanger body into threaded openings 22 in the slips. Reference numeral 23 designates a casing or pipe passed through the opening 18 and supported by the slips.

Formed intermediate rings 16 and 17, between the hanger body and the seat 13, and here shown as being formed entirely in the hanger body, is an annular groove 24 with which communicates a radial passage 25 formed in flange 12 and provided with a check valve 26 normally urged by a spring 27 against a seat provided by a nipple 28. The outer end of passage 25 is enlarged and threaded as at 29 for threaded connection with a gun by means of which a fluid or plastic substance may be injected.

Formed in the wall of opening 18 above bowl 19 is an annular groove 30 of rectangular section in which are disposed top and bottom packing sealing rings 31 and 32. Reference numeral 33 designates passages connecting grooves 24 and 30. As here shown, the passages 33 are angular, this resulting from the fact that the lower end of each passage is drilled in from groove 24 and the upper end is drilled in from groove 30 so that ample metal is left between the passages and the slip bowl.

With a gun connection applied to socket 29, plastic packing material P can be forced into groove 24 and thence through passages 33 into groove 30 between the sealing rings 31 and 32 so that not only will the latter be borne against the pipe periphery but the packing material itself will be swelled into peripheral contact with the pipe between the rings, as shown. In order to vent the supply passages while the packing material is being injected, we provide in the flange 12 a radial passage 34 exactly like the passage 25 and equipped with the same check valve 35 except that in this case the valve is provided with a headed stem 36 so that the valve may be tripped. For testing the sealing pressure, a gauge may be applied to the socket 37, tripping the check valve 35.

While the seal provided by the rings 31 and 32 and the packing material P is entirely effective, it is not intended to be relied on as a permanent seal. As in the above-mentioned Roye patent, the casing head 10 was originally equipped with a master control valve and, thereabove, at least one blow-out preventer, all of the same rated size as the casing head and enabling the hanger 14 to be lowered therethrough to seating position. When the hanger has been seated and groove 30 has been packed in the manner described, the well pressure is completely sealed off. The packing in the groove 30 forms a seal between the hanger and the pipe while the rings 15 and 16 provide a seal between the hanger and the casing head seat. Under these circumstances, the control equipment, i. e., the master control valve and blowout preventer or preventers, can be safely lifted away and a permanent seal formed between the pipe and hanger. In Figure 1, this permanent seal is provided by a weld 38 just as in the said Roye patent but, unlike the latter, the weld can be formed with perfect safety since no gas can escape between the hanger and the pipe.

In the absence of openings such as 21 and 22, groove 30 could be disposed below the slip bowl but obviously when such openings are provided the groove 30 cannot be disposed therebelow since otherwise the packing in the groove could be by-passed by the well pressure.

Reference numeral 39 designates a second casing head engaged with the upper tapered portion 40 of the hanger 14.

In Figure 2, the casing heads 41 and 42 are the same as in Figure 1 and the hanger 43 is generally the same insofar as its manner of cooperating with the heads and supporting the pipe 44 is concerned. The lower tapered portion of the hanger is provided with a peripheral groove 45 between a pair of hydraulic packing rings 46 and 47, the groove 45 being in communication with supply and vent passages in the flange of head 41.

Formed in the wall of the opening or bore 48 of the hanger is an annular groove 49 which is rectangular except that its upper wall is slightly upwardly and inwardly inclined. Received in groove 49 is a rubber packing ring 50 of rectangular section which is provided in its rear face with an undercut channel 51, and which, at its top, is split near its inner edge to provide an annular lip 52. Passages generally indicated by the reference numeral 53 connect groove 45 with groove 49 opposite channel 51, each passage 53 comprising a portion 54 drilled in from the groove 45 and intersecting a portion 55 drilled in radially from the outside and having its outer end permanently plugged at 55'. The injected pressure medium swells the packing 50 about the pipe and expands the channel lips against the outer wall of groove 49 so that a tight seal is formed between the hanger and the pipe.

The upper end of the hanger bore is enlarged and threaded and terminates downwardly in a shoulder 56 which tapers steeply downwardly into adjacency with the pipe 44. Reference numeral 57 designates a ring of hard packing material, such as hydraulic packing, tapered to substantially mate with the shoulder 56, and on top of the packing ring is a metal pressure or wear ring 58 which is engaged by a gland ring 59 threaded in the top of the hanger body. By threading down on ring 59, the packing ring 57 is wedged by shoulder 56 into tight peripheral engagement with the pipe to form a permanent seal. Any ordinarily flowable packing could not be used in this point due to the danger of its being blown out by the well pressure, and an adequately hard and stable packing such as a hydraulic packing could not be successfully used except for the provision of a wedging action which definitely causes the packing to seal around the pipe when the gland ring is adequately tightened.

In order to test the permanent seal after it has been set, we may provide a passage 60 which extends from a threaded socket 61 in the outside of the hanger to the space between packing rings 50 and 57. A source of pressure can be connected into the socket 61 and then observation made for leakage at the top of the gland ring. The pressure entering behind lip 52 forces the lip into engagement with the pipe, thus giving a double assurance of no leakage downwardly. After the testing, a permanent plug is threaded into socket 61 in a manner not to interfere with the setting of the head 42. It will be understood that the same testing provisions can be applied in the form shown in Figure 1.

Instead of, or in addition to, providing the wedge shoulder 56 on the hanger body, the wear ring or equivalent ring may be constituted as a wedging element, as shown in Figure 3. In that figure the shoulder 56' of hanger 43' is square, as is also the lower edge of the ring 57' of hard packing material. The outer surface of ring 57' is sharply tapered upwardly and the wear ring 58' is internally tapered so as to conform substantially to the taper of ring 57'. By threading in the gland ring 59' the hard packing ring will be contracted with the same effect as in Figure 2. In both figures the angle between the wedge faces and the hanger axis is substantially less than 45°. The steep angle gives a favorable action and is thus preferred.

It is often difficult to produce perfect welds between the hanger and pipe, particularly when the latter are made of the harder grades of metal. This difficulty can be successfully obviated by the use of the hard packing ring and wedging means.

Outside of the procedure involving the new safety provisions, the well building procedure is preferably the same as that described in the said Roye patent insofar as the handling of the control equipment and setting of the hanger is concerned. The form and arrangement of parts can be varied from that shown and obviously the invention is applicable to other forms of slip type suspension hangers. We do not limit ourselves in these respects except as in the following claims, and where the term "rubber" is used therein, any suitable rubber or rubber-like material, natural or synthetic, is intended.

We claim:

1. A slip type suspension hanger comprising a body having a tapered portion receivable in an upwardly flared casing head seat, said portion having a plurality of peripheral packing rings for sealing engagement with said seat, an annular groove formed in said portion between a pair of said rings, said body having an axial opening therethrough which has an enlarged zone constituting a slip bowl, the wall of said opening having an annular groove therein, and a passage in said body connecting said annular grooves.

2. A construction in accordance with claim 1 wherein said hanger has an upper inwardly tapered surface to seal with an upper casing head mounted above the first named casing head.

3. A construction in accordance with claim 1 wherein said hanger has means at its upper end for the formation of a permanent seal in said opening between the hanger and the casing which it suspends, and wherein said annular groove in the wall of said opening is located below said permanent sealing means.

4. A slip type suspension hanger comprising a body having a tapered portion receivable in an upwardly flared casing head seat, said portion having a plurality of peripheral packing rings for sealing engagement with said seat, an annular groove formed in said portion between a pair of said rings, said body having an axial opening therethrough which has an enlarged zone constituting a slip bowl, the wall of said opening having an annular groove therein, a flexible rubber ring in the last-named groove having an annular channel in its outer face, and a passage in said body connecting said annular grooves and entering said last named groove opposite said channel.

5. A hanger according to claim 4 wherein the channel is undercut.

6. In apparatus of the character described, a casing head having an inside downwardly tapered bowl formed to provide a hanger seat and an exterior flange for connection with control equipment, a hanger having an outer surface to conform with and seat in the bowl of said casing head and being of size and shape adapting it for lowering through control equipment, said hanger having means adjacent its upper end for there forming a permanent seal with the casing, said hanger having a longitudinal bore therethrough of diameter to permit sliding movement of the hanger along the outside of the casing and means therein to support the casing against downward movement through the hanger when the latter is seated in said casing head, the wall of said bore having an inside groove to surround the casing, said groove being positioned below the means for forming a permanent seal, a passage extending from the exterior of said casing head through its flange to said seat, and a cooperating passage extending through said hanger from said groove to its outside seating surface adapted to be registered with said casing head passage when the hanger is seated.

7. Apparatus of the character described comprising a casing head and a hanger of size and shape adapting it for lowering through control equipment, said casing head having an inside downwardly tapered seat formed to receive said hanger to thereby support the weight of an inner pipe suspended from said hanger, said casing head having a passage extending from its outer surface and opening into the tapered portion of said seat, and means to prevent outward flow of fluid through said passage, said hanger having an outside surface formed to fit said seat and sealing means thereon to form seals with said seat surrounding said opening from said passage by the weight of the inner pipe when said hanger is landed in said casing head through the control equipment, said hanger having a bore therethrough and means therein to receive and support the inner pipe against downward movement through the hanger, the wall of said bore having an annular packing groove therein to surround the inner pipe, and a conduit extending through said hanger from said groove to its outer surface and connecting with said opening from said passage within the seals on said outer surface.

8. A construction in accordance with claim 7 wherein said casing head is provided with an upper flange for connection with equipment to be mounted above the same, and wherein said passage extends through said flange and opens into said seat.

9. Apparatus of the character described comprising a casing head and a hanger of size and shape adapting it for lowering through control equipment, said casing head having an inside downwardly tapered seat formed to receive said hanger to thereby support the weight of an inner pipe suspended from said hanger, said casing head having a passage extending from its outer surface and opening into the tapered portion of said seat, said hanger having a surface formed to fit said seat and spaced peripheral sealing rings thereon to form seals with said seat above and below the opening from said passage by the weight of the inner pipe when said hanger is landed in said casing head, said hanger having a peripheral groove in its seating surface between said rings positioned to register with the opening from said passage when said hanger is landed, said hanger having a bore therethrough and slips therein to receive and support the inner pipe against downward movement through the hanger, the wall of said bore having an annular packing groove therein to surround the inner pipe, said hanger having a conduit extending therethrough from said annular groove in its outer surface between said packing rings and opening into said annular groove in the wall of said bore.

10. A hanger comprising a unitary structure having a lower external tapered surface to conform with and seat in the tapered bowl of a casing head, said hanger being of size and shape adapting it for lowering through control equipment mounted on the casing head, said hanger having a longitudinal bore therethrough and means therein to receive and support the casing against downward movement through the hanger, the wall of said bore having an annular packing groove therein to surround the casing, said lower tapered surface having a pair of spaced peripheral packing rings thereon adapted to form a seal with the bowl of the casing head by the weight of the casing suspended from said hanger, and a conduit in said hanger through which fluid under pressure may be applied to cause packing in said groove to form a seal between the bore of said hanger and the casing, said conduit extending from said groove and opening into said lower tapered surface between said packing rings.

11. A construction in accordance with claim 10 wherein said lower tapered surface has an open peripheral groove extending around the hanger between said packing rings and wherein said conduit opens into said peripheral groove.

JOHN LEMLEY.
ERWIN F. HILL.
ROBERT A. MUELLER.

REFERENCES CITED

The following references are of record in the file of this patent:

UNITED STATES PATENTS

| Number | Name | Date |
|---|---|---|
| 1,973,809 | Heggem | Sept. 18, 1934 |
| 2,129,433 | MacClatchie | Sept. 6, 1938 |
| 2,207,469 | Roye | July 9, 1940 |
| 2,228,555 | Barker | Jan. 14, 1941 |
| 2,306,102 | Penick, et al. | Dec. 22, 1942 |
| 2,313,169 | Penick et al. | Mar. 9, 1943 |
| 2,350,867 | Bean et al. | June 6, 1944 |